J. M. & J. L. JONES.
Wheelbarrows.
No. 147,845. Patented Feb. 24, 1874.
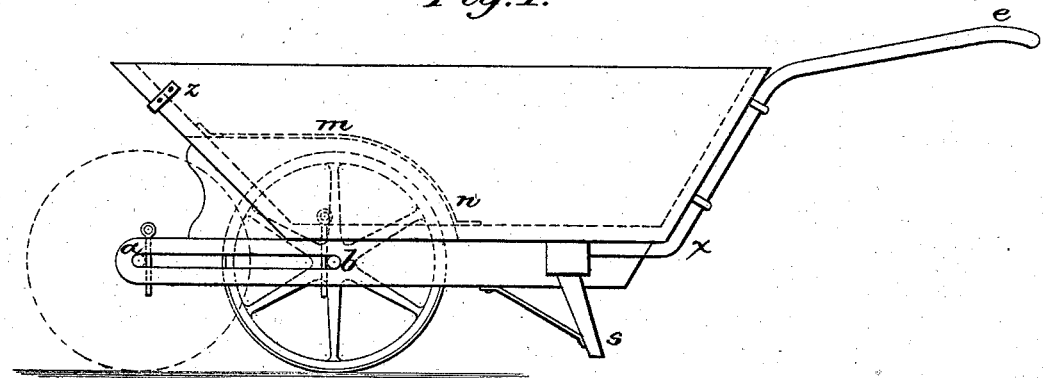
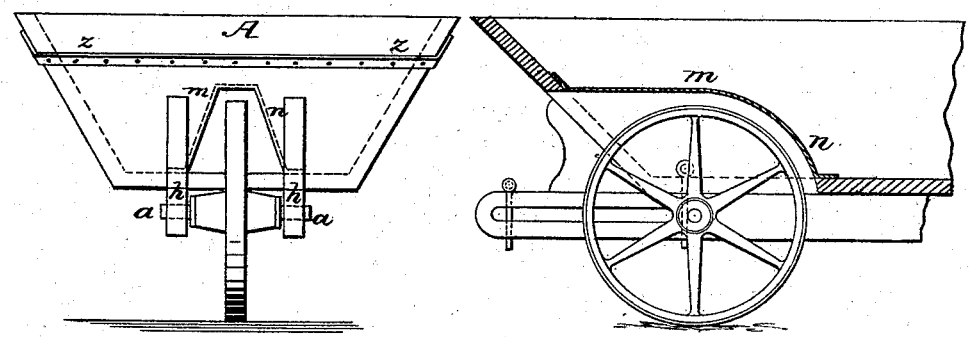
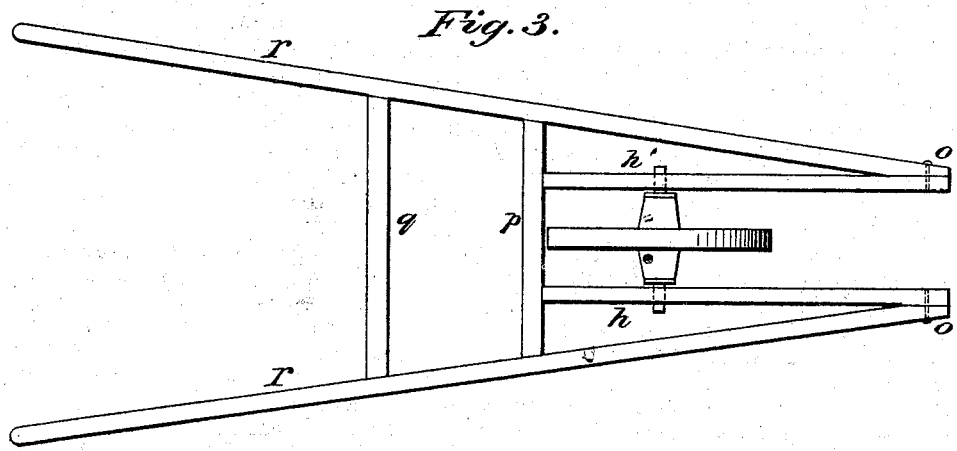
Witnesses.
B. R. Hutchcraft
William Talbott Jones
Inventors.
Joseph Matthias Jones
James Lawrence Jones

UNITED STATES PATENT OFFICE.

JOSEPH M. JONES, OF PARIS, AND JAMES L. JONES, OF LEXINGTON, KY.

IMPROVEMENT IN WHEELBARROWS.

Specification forming part of Letters Patent No. 147,845, dated February 24, 1874; application filed January 5, 1874.

*To all whom it may concern:*

Be it known that we, JOSEPH MATTHIAS JONES, of Paris, Kentucky, and JAMES LAWRENCE JONES, of Lexington, Kentucky, have invented an Improved Wheelbarrow, of which the following is a specification:

The object of our invention is an improvement of the wheelbarrow for which Letters Patent were granted your petitioners on the 21st day of October, 1873, being Letters Patent No. 143,767, in manner and form following, to wit: To so construct the barrow as to admit a deeper bed and larger wheel, by letting the same work through the bottom of the bed, and by providing an arched cover for the same; and, also, by providing stop-pins for regulating the wheel.

These objects are accomplished as will more fully appear by reference to Figure No. 7 of the accompanying drawings, in which—

*a b* represent two stop-pins, passing through the runners and the slot, so as to hold the wheel in place when it is desired to have it stationary.

In working up hill some difficulty is encountered in propelling the barrow when the wheel is at *b;* and, in order to obviate this trouble, the pins are placed at *a* behind the pivot of the wheel, thereby securing it at that point. Some difficulty may be experienced also on a steep down-grade, to obviate which the wheel may be secured at *b* by placing the pins before the wheel.

In order to secure a larger wheel and deeper bed the runners, in which the slot *a b* is cut, are not extended so low beneath the bed as in the original patent, and the wheel runs through the bottom of the barrow, as seen in Fig. 1.

Another object in running the wheel through the bed is to get the load closer to the ground, and prevent thereby the disposition to tilt, which would be experienced in using the large wheel entirely beneath the bed.

In Fig. 1, *m n* represent an arch, to be made of wood, cast, or sheet iron, preference being given to the latter, which is designed to cover the wheel and prevent the load from wasting through the opening in the bottom of the bed. This arch is securely fastened to the bottom of the bed, and also to its forward end, and should be sufficiently sloped toward the top, as seen in Fig. 2, to prevent it from being wrenched by the load from side to side. The arch *m n* should be so constructed as to admit the free passage of the wheel back and forth through it.

The present plan of a wheel, working up through the bed, prevents the use of the usual cross-piece which unites the fore part of the barrow, and leaves only the two in the rear, *q p*, of Fig. 3. The parallel runners *h h* are firmly riveted to the handle-pieces at *o o* and mortised to the cross-piece *p*. By this means, and the use of a stout piece of hoop-iron running across the forward end of the bed, as seen in Fig. 2, *z z*, which is bent and turned down the sides, sufficient strength is given to the forward part of the barrow. A piece of sheet-iron, large enough to cover the entire forward end of the bed, except an opening for the wheel, and securely fastened to the bottom of the bed, would give still greater strength to the frame.

If desired by the manufacturer, the runners *h h* may be dispensed with entirely by having the handle-pieces *r o* of Fig. 3 to run parallel, and the hub of the wheel lengthened so as to reach them. The slot *a b* would then be cut in the handle-pieces *r o* without otherwise altering the barrow.

Having thus described our invention, so that others skilled in the art may make and use it, what we desire to secure by Letters Patent, and claim as our invention, is—

1. The wheelbarrow-bed having a covered recess to receive the wheel, the slotted guides, and the wheel and axle, all combined substantially as and for the purpose set forth.

2. The slotted guides *h*, in which the axle of the wheel may move back and forth, provided with stop-pins, so that the axle can be retained either at the front or rear end of the slots, substantially as and for the purpose set forth.

JOSEPH MATTHIAS JONES. [L. S.]
JAMES LAWRENCE JONES. [L. S.]

Witnesses:
B. R. HUTCHCRAFT,
WILLIAM TALBOTT JONES.